(12) United States Patent
Kim et al.

(10) Patent No.: US 11,015,696 B2
(45) Date of Patent: May 25, 2021

(54) DAMPER PULLEY FOR CRANKSHAFT

(71) Applicants: HYUNDAI MOTOR COMPANY, Seoul (KR); KIA MOTORS CORPORATION, Seoul (KR)

(72) Inventors: Seong Yong Kim, Gunpo-si (KR); Sung Kwang Kim, Seoul (KR); Tae Hoon Roh, Seoul (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 385 days.

(21) Appl. No.: 15/996,919

(22) Filed: Jun. 4, 2018

(65) Prior Publication Data

US 2019/0277387 A1    Sep. 12, 2019

(30) Foreign Application Priority Data

Mar. 8, 2018   (KR) .................. 10-2018-0027553

(51) Int. Cl.
*F16H 55/36* (2006.01)
*F16F 15/126* (2006.01)

(52) U.S. Cl.
CPC .......... *F16H 55/36* (2013.01); *F16F 15/126* (2013.01); *F16H 2055/366* (2013.01)

(58) Field of Classification Search
CPC ... F16H 55/36; F16H 2055/366; F16F 15/126
See application file for complete search history.

(56) References Cited

U.S. PATENT DOCUMENTS

| | | | |
|---|---|---|---|
| 5,591,093 A | 1/1997 | Asai et al. | |
| 7,618,337 B2* | 11/2009 | Jansen | F02B 67/06 |
| | | | 192/41 S |
| 8,038,554 B2 | 10/2011 | Watanabe et al. | |
| 2006/0030441 A1 | 2/2006 | Watanabe et al. | |
| 2006/0172832 A1* | 8/2006 | Watanabe | F16H 55/36 |
| | | | 474/94 |

(Continued)

FOREIGN PATENT DOCUMENTS

| | | |
|---|---|---|
| CN | 1666034 A | 9/2005 |
| CN | 1823239 A | 8/2006 |

(Continued)

OTHER PUBLICATIONS

Chinese Office Action dated Dec. 2, 2020 from the corresponding Chinese Application No. 2018107153487, 16 pp.

(Continued)

*Primary Examiner* — Michael R Mansen
*Assistant Examiner* — Robert T Reese
(74) *Attorney, Agent, or Firm* — Brinks Gilson & Lione

(57) ABSTRACT

A damper pulley for a crankshaft may include: a hub including a first cylindrical portion, a first closed end provided at one end of the first cylindrical portion, and a first open end provided at the other end of the first cylindrical portion; and a pulley including a second cylindrical portion having a plurality of grooves, a second closed end provided at one end of the second cylindrical portion, and a second open end provided at the other end of the second cylindrical portion. In particular, the first closed end of the hub and the second closed end of the pulley are combined into one unit.

8 Claims, 3 Drawing Sheets

(56) References Cited

U.S. PATENT DOCUMENTS

| | | | | |
|---|---|---|---|---|
| 2009/0000421 A1* | 1/2009 | Christenson | .......... | F16F 15/126 |
| | | | | 74/574.4 |
| 2012/0100945 A1* | 4/2012 | Ishida | .................... | F16D 43/18 |
| | | | | 474/69 |
| 2016/0146328 A1* | 5/2016 | Dell | ...................... | B60K 25/02 |
| | | | | 474/94 |
| 2018/0023658 A1* | 1/2018 | Shah | ...................... | F16H 55/36 |
| | | | | 464/51 |
| 2019/0277387 A1 | 9/2019 | Kim et al. | | |

FOREIGN PATENT DOCUMENTS

| | | |
|---|---|---|
| CN | 202531775 U | 11/2012 |
| DE | 603 10 926 T2 | 10/2007 |
| DE | 60 2004 011 941 T2 | 2/2009 |
| JP | 2007-315415 A | 12/2007 |
| JP | 4628100 B2 | 2/2011 |
| KR | 10-2011-0007404 | 1/2011 |
| KR | 10-1285815 B1 | 7/2013 |
| KR | 10-1610138 B1 | 4/2016 |
| KR | 10-1644320 B1 | 7/2016 |
| KR | 10-2019-0106287 A | 9/2019 |
| WO | 2004/011818 A1 | 2/2004 |

OTHER PUBLICATIONS

German Office Action dated Feb. 6, 2021 from the corresponding German Application No. 10 2018 113 626.9, 10 pp.

* cited by examiner

DAMPER PULLEY FOR CRANKSHAFT

CROSS-REFERENCE TO RELATED APPLICATION

This application claims priority to and the benefit of Korean Patent Application No. 10-2018-0027553, filed on Mar. 8, 2018, in the Korean Intellectual Property Office, which is incorporated herein by reference in its entirety.

FIELD

The present disclosure relates to a damper pulley for a crankshaft.

BACKGROUND

The statements in this section merely provide background information related to the present disclosure and may not constitute prior art.

As is well known in the art, internal combustion engines are used to drive automobiles and other vehicles. Typically, the reciprocating operation of cylinders in an internal combustion engine generates power that is transmitted to wheels of a vehicle through a crankshaft. The engine has a cylinder head consisting of numerous cylinders where a sequential explosion of gases in the cylinders drives the crankshaft.

The rotation and torque of the crankshaft may cause many modes of unwanted vibrations. A damper pulley may be mounted on one end (accessory drive) of the crankshaft of the internal combustion engine to counter torsional and resonance vibrations from the crankshaft.

The rotation and torque of the crankshaft may cause many modes of unwanted vibrations. A damper pulley may be mounted on one end (accessory drive) of the crankshaft of the internal combustion engine to counter torsional and resonance vibrations from the crankshaft.

The damper pulley includes a hub to which one end of the crankshaft is fitted, a rim connected to the hub, a pulley mounted on the outer surface of the hub, and rubber fixed between the hub and the pulley. An oil seal may be provided on the outer surface of the hub of the damper pulley. The oil seal may be interposed between a cylinder block and the damper pulley, thereby preventing oil from being leaked between the cylinder block and the damper pulley.

In a conventional damper pulley, the pulley may be bonded to the outer surface of the hub by the rubber, and at least one accessory belt may be wrapped around the circumference of the pulley.

In the conventional damper pulley, the vibration of the engine may be sequentially transmitted to the crankshaft, the hub, the rubber, the pulley, and the accessory belt, and a relative motion between the hub and the pulley may be caused by the rubber, thereby increasing the torsional vibrations transmitted to the pulley. As the torsional vibrations transmitted to the pulley and the accessory belt are increased compared to the torsional vibrations of the engine, vibration in the belt span, belt slip, and noise may be increased, and thus the durability of the accessory belt may be reduced.

SUMMARY

The present disclosure addresses the above-mentioned problems occurring in the prior art.

An aspect of the present disclosure provides a damper pulley for a crankshaft, capable of reducing torsional vibrations and NVH transmitted to a pulley and an accessory belt, and improving durability.

According to an aspect of the present disclosure, a damper pulley for a crankshaft may include: a hub including a first cylindrical portion, a first closed end provided at one end of the first cylindrical portion, and a first open end provided at the other end of the first cylindrical portion; and a pulley including a second cylindrical portion having a plurality of grooves, a second closed end provided at one end of the second cylindrical portion, and a second open end provided at the other end of the second cylindrical portion, wherein the first closed end of the hub and the second closed end of the pulley are combined.

The first cylindrical portion of the hub may be arranged to be concentric with the second cylindrical portion of the pulley.

The second closed end of the pulley may have an offset portion forming a recess, and the first closed end of the hub may be received in the recess of the offset portion.

A plurality of holes may be provided in the first closed end of the hub and the second closed end of the pulley.

A first annular mass may be mounted on an outer surface of the first cylindrical portion of the hub through a first rubber.

A second annular mass may be mounted on an inner surface of the second cylindrical portion of the pulley through a second rubber.

The first annular mass and the second annular mass may be arranged in a radial direction of the hub.

The first annular mass may have a mass body extending along an axis of the hub, and a disc portion extended from an edge of the mass body in an outer diameter direction thereof.

The mass body of the first annular mass and an inner surface of the second annular mass may be spaced apart from each other by a first gap in the radial direction of the hub, and the disc portion of the first annular mass and a lateral end portion of the second annular mass may be spaced apart from each other by a second gap in a longitudinal direction of the hub.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
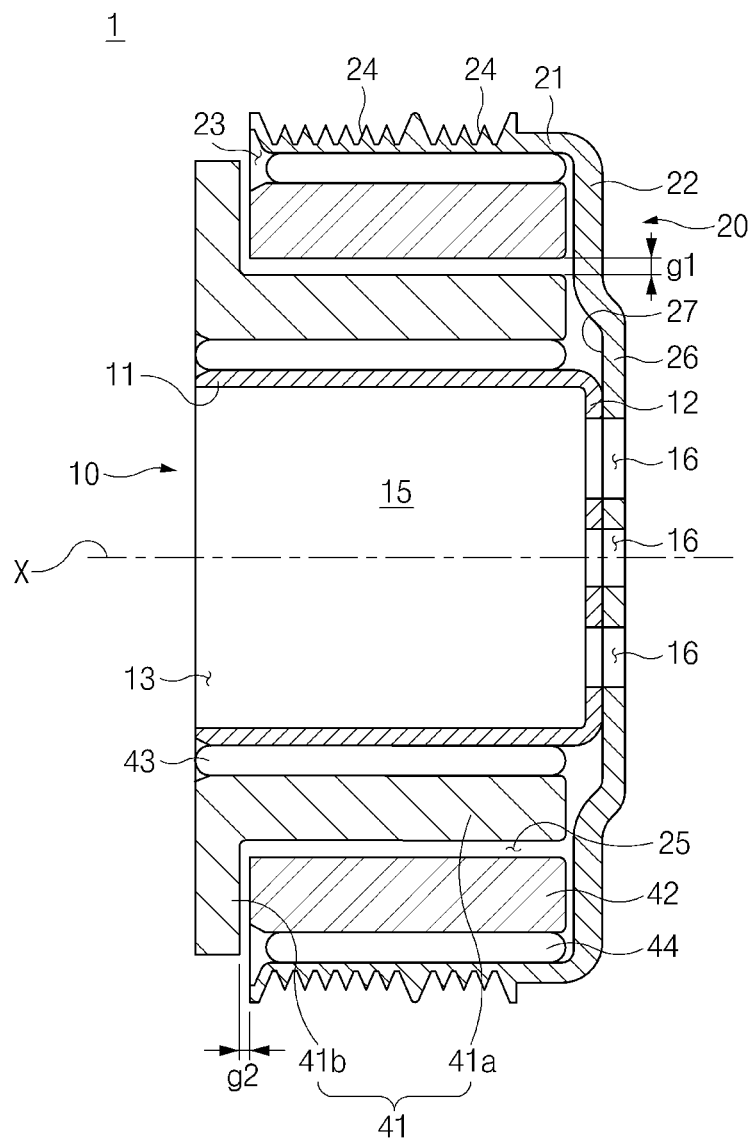
FIG. 1 illustrates a cross-sectional view of a damper pulley for a crankshaft according to an exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In addition, a detailed description of well-known techniques associated with the present disclosure will be ruled out in order not to unnecessarily obscure the gist of the present disclosure.

Terms such as first, second, A, B, (a), and (b) may be used to describe the elements in exemplary forms of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 2:
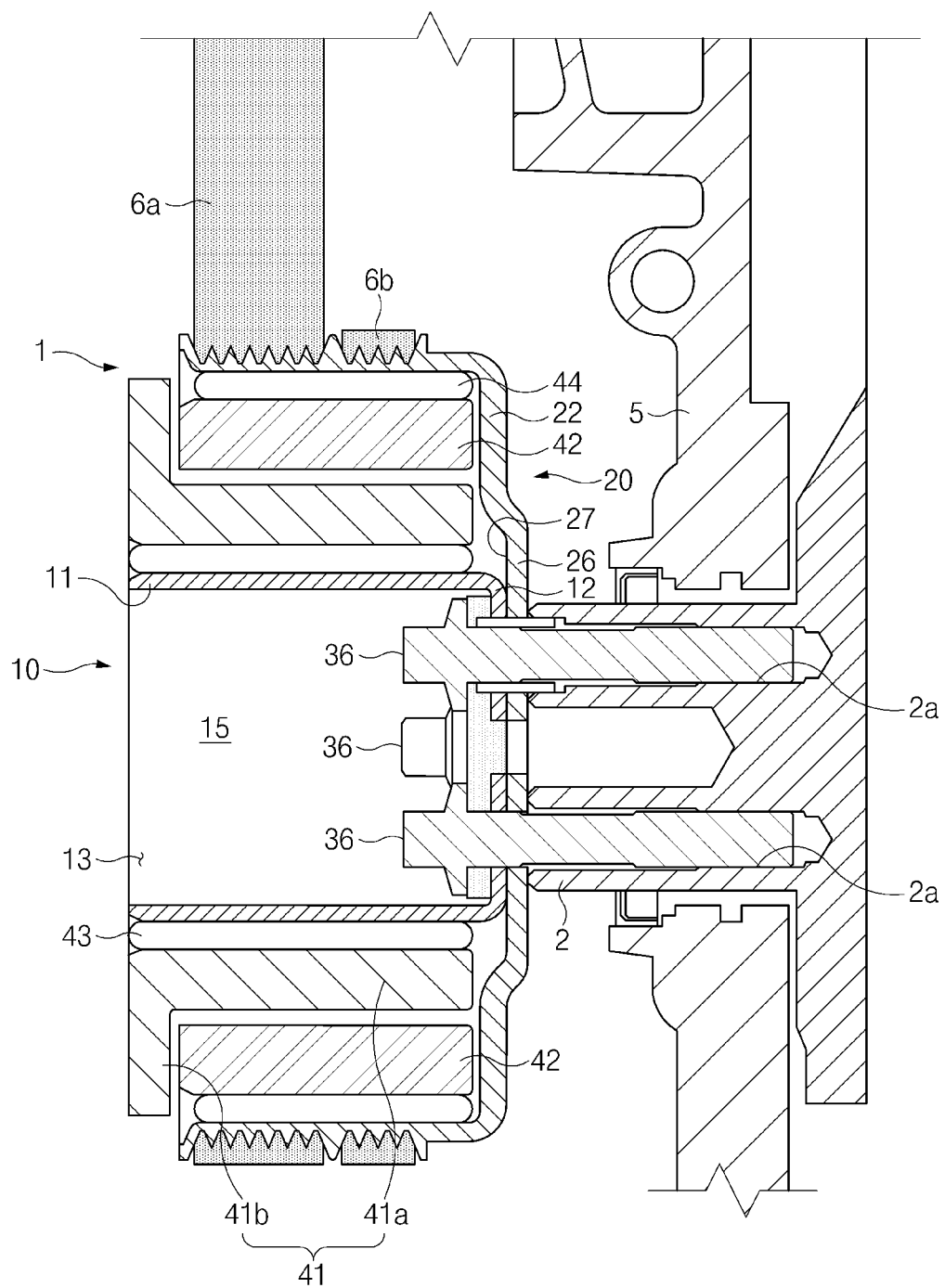
FIG. 2 illustrates a cross-sectional view of a structure in which a damper pulley according to an exemplary form of the present disclosure is fitted to a crankshaft.

Referring to FIGS. 1 and 2, a damper pulley 1 according to an exemplary form of the present disclosure includes a hub 10 connected to one end of a crankshaft 2, and a pulley 20 integrated with the hub 10.

The crankshaft 2 may be rotatably mounted on a cylinder block (not shown), and a cover 5 may be detachably mounted on one side of the cylinder block. The crankshaft 2 may have a sprocket (not shown) on the outer surface thereof, and a timing belt or timing chain may be wrapped around the sprocket. The timing belt or timing chain may be covered by the cover 5.

The hub 10 may have a first cylindrical portion 11 extending along an axis X, and a first cavity 15 may be formed in the first cylindrical portion 11. One end of the first cylindrical portion 11 may be provided with a first closed end 12, and the other end of the first cylindrical portion 11 may be provided with a first open end 13.

The pulley 20 may be concentric with respect to the axis X of the hub 10, and the pulley 20 may have a second cylindrical portion 21 extending along the axis X of the hub 10. A second cavity 25 may be formed in the second cylindrical portion 21. One end of the second cylindrical portion 21 may be provided with a second closed end 22, and the other end of the second cylindrical portion 21 may be provided with a second open end 23.

The pulley 20 may have a plurality of grooves 24 in the outer surface of the second cylindrical portion 21, and protrusions of an accessory belt 6 may mesh with the plurality of grooves 24. One or more accessory belts 6a and 6b may be wrapped around the second cylindrical portion 21 of the pulley 20.

The first closed end 12 of the hub 10 and the second closed end 22 of the pulley 20 may be combined into one unit. In other words, the first closed end 12 of the hub 10 and the second closed end 22 of the pulley 20 may be directly combined so that the hub 10 and the pulley 20 may rotate together. The second closed end 22 of the pulley 20 may have an offset portion 26 for formation of a recess 27. The first closed end 12 of the hub 10 may be received in the recess 27 of the pulley 20 so that a compact size of the damper pulley 1 may be effectively achieved. In addition, the rigidity of the second closed end 22 of the pulley 20 may be increased by the offset portion 26, and thus the first closed end 12 of the hub 10 and the second closed end 22 of the pulley 20 may be combined more firmly.

According to an exemplary form, the first closed end 12 of the hub 10 may be directly combined with the second closed end 22 of the pulley 20 by welding or using fasteners so that the hub 10 may be integrated with the pulley 20.

According to another exemplary form, the first closed end 12 of the hub 10 and the second closed end 22 of the pulley 20 may be formed as a single unitary body by casting or the like so that the hub 10 may be integrated with the pulley 20.

A plurality of holes 16 may be formed in the first closed end 12 of the hub 10 and the second closed end 22 of the pulley 20. In particular, the plurality of holes 16 may be formed to allow fasteners 36 to pass through the first closed end 12 of the hub 10 and the second closed end 22 of the pulley 20. As the fasteners 36 are fastened to the plurality of holes 16 and engaging grooves 2a of the crankshaft 2, the first closed end 12 of the hub 10 and the second closed end 22 of the pulley 20 may be connected to the crankshaft 2.

According to the exemplary form of the present disclosure, the pulley 20 and the hub 10 may not be fixed by rubber or the like, and instead, the second closed end 22 of the pulley 20 and the first closed end 12 of the hub 10 may be combined into one unit so that the pulley 20 and the hub 10 may rotate together, and thus a relative motion or displacement may not occur between the pulley 20 and the hub 10. As the relative motion does not occur between the pulley 20 and the hub 10, the torsional vibrations of the engine may be directly transmitted to the accessory belts 6a and 6b through the pulley. As the torsional vibrations of the engine are directly transmitted to the accessory belts 6a and 6b, the torsional vibrations of the engine may not be amplified, and thus the torsional vibrations and NVH transmitted to the accessory belts 6a and 6b may be reduced, and durability may be significantly improved.

The aforementioned novel structure of the damper pulley 1 for a crankshaft, according to an exemplary form of the present disclosure, may be applied to a dual mass rubber damper pulley.

As illustrated in FIGS. 1 and 2, a first annular mass 41 may be mounted on the outer surface of the first cylindrical portion 11 of the hub 10 through first rubber 43, and the first rubber 43 may be fixed between the hub 10 and the first annular mass 41.

A second annular mass 42 may be mounted on the inner surface of the second cylindrical portion 21 of the pulley 20 through second rubber 44, and the second rubber 44 may be fixed between the pulley 20 and the second annular mass 42.

The first annular mass 41 may be mounted on the outer surface of the first cylindrical portion 11 of the hub 10, and the second annular mass 42 may be mounted on the inner surface of the second cylindrical portion 21 of the pulley 20 such that the first annular mass 41 and the second annular mass 42 may be arranged in a radial direction of the hub 10, and the first annular mass 41 and the second annular mass 42 may be spaced apart from each other by predetermined gaps g1 and g2 so as not to be brought into contact with or interfered with each other.

The first annular mass 41 may have a mass body 41a extending along the axis X of the hub 10, and a disc portion 41b extended from an edge of the mass body 41a in an outer diameter direction thereof. The mass body 41a of the first annular mass 41 and the inner surface of the second annular mass 42 may be spaced apart from each other by a first gap g1 in the radial direction of the hub 10, and the disc portion 41b of the first annular mass 41 and a lateral end portion of the second annular mass 42 may be spaced apart from each other by a second gap g2 in a longitudinal direction of the hub 10. The disc portion 41b may be extended in a direction perpendicular to the mass body 41a, and thus the longitudinal vibration of the hub 10 may be effectively reduced by the disc portion 41b of the first annular mass 41.

Figure 3:
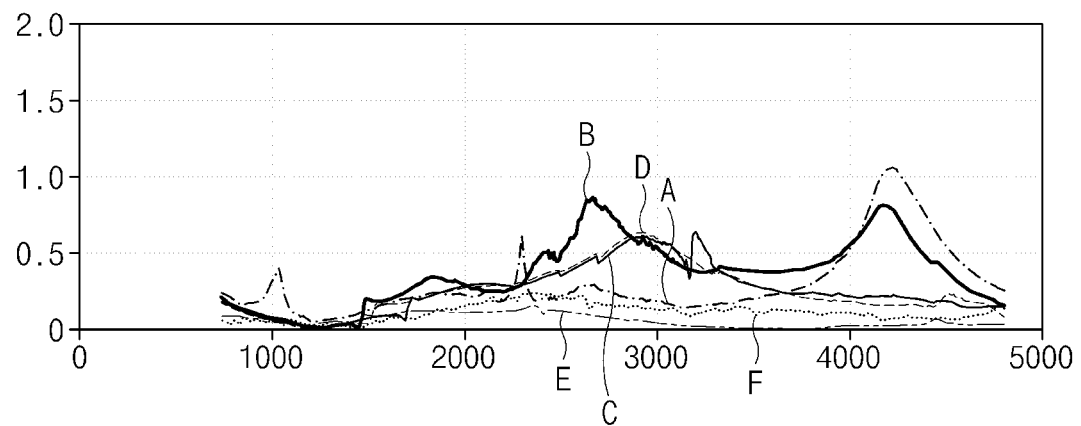
FIG. 3 illustrates a graph of engine RPM vs the amplitude of torsional vibration with respect to a variety of damper pulleys for crankshaft.

FIG. 3 illustrates a graph of comparison between torsional vibration transmitted to a hub and torsional vibration transmitted to a pulley with respect to a variety of damper pulleys.

Line A and line B in FIG. 3 represent torsional vibration transmitted to a dual mass rubber damper pulley. The dual mass rubber damper pulley includes two masses individually connected by two rubber elements. In FIG. 3, line A represents the amplitude of torsional vibration transmitted to the hub in the dual mass rubber damper pulley, and line B represents the amplitude of torsional vibration transmitted to the pulley in the dual mass rubber damper pulley. As a result of comparison between line A and line B, it can be seen that the amplitude of torsional vibration transmitted to the pulley (line B) is greater than the amplitude of torsional vibration transmitted to the hub (line A) in an engine RPM range of approximately 2000-3000, and a difference therebetween is sharply increased around 2800 RPM.

As the dual mass rubber damper pulley has two rubber elements, a relative motion occurs between the pulley and the hub, so the amplitude of torsional vibration transmitted to the pulley (line B) may be increased compared to the amplitude of torsional vibration transmitted to the hub (line A). Thus, vibration in the belt span, belt slip, noise may be increased, whereby the durability of the accessory belt may be reduced.

On the contrary, as the novel structure of the damper pulley 1 according to an exemplary form of the present disclosure is applied to the dual mass rubber damper pulley, it may substantially reduce or prevent the torsional vibration transmitted to the pulley from being increased compared to the torsional vibration transmitted to the hub, so that the torsional vibration transmitted to the pulley may be similar to the torsional vibration transmitted to the hub. Thus, the torsional vibration and NVH transmitted to the accessory belt may be reduced, and durability may be significantly improved.

Line C and line D in FIG. 3 represent torsional vibration transmitted to a viscous damper pulley. The viscous damper pulley reduces vibrations using a viscous fluid. In FIG. 3, line C represents the amplitude of torsional vibration transmitted to the hub in the viscous damper pulley, and line D represents the amplitude of torsional vibration transmitted to the pulley in the viscous damper pulley. As a result of comparison between line C and line D, it can be seen that the amplitude of torsional vibration transmitted to the pulley (line D) is slightly greater than the amplitude of torsional vibration transmitted to the hub (line C).

As a difference between the amplitude of torsional vibration transmitted to the pulley (line D) and the amplitude of torsional vibration transmitted to the hub (line C) in the viscous damper pulley is not large, the torsional vibration and NVH transmitted to the accessory belt may be reduced. However, the cost may be relatively high as several components in connection with the viscous fluid are required.

Line E and line F in FIG. 3 represent torsional vibration transmitted to a viscous-isolation damper pulley. The viscous-isolation damper pulley includes a viscous fluid and an isolation damper.

In FIG. 3, line E represents the amplitude of torsional vibration transmitted to the hub in the viscous-isolation damper pulley, and line F represents the amplitude of torsional vibration transmitted to the pulley in the viscous-isolation damper pulley. As a result of comparison between line E and line F, it can be seen that the amplitude of torsional vibration transmitted to the pulley (line F) is greater than the amplitude of torsional vibration transmitted to the hub (line E).

As the amplitude of torsional vibration transmitted to the pulley (line F) and the amplitude of torsional vibration transmitted to the hub (line E) are relatively low in the viscous-isolation damper pulley, the torsional vibration and NVH transmitted to the accessory belt may be reduced. However, the cost of the viscous-isolation damper pulley may be higher than that of the viscous damper pulley.

As can be seen in the graph of FIG. 3, since a difference between the torsional vibrations transmitted to the pulley and the hub is relative small in the viscous damper pulley and the viscous-isolation damper pulley, the torsional vibration and NVH transmitted to the accessory belt may be reduced, but the cost may be relatively high. On the other hand, the cost of the dual mass rubber damper pulley is relatively low, but a difference between the torsional vibrations transmitted to the pulley and the hub is relative large in the dual mass rubber damper pulley. In order to solve the aforementioned problems, the damper pulley 1 according to the exemplary form of the present disclosure may have the novel improved structure that effectively reduces the torsional vibration, NVH, and the like at a low cost.

Meanwhile, the novel structure of the damper pulley 1 according to exemplary forms of the present disclosure may be applied to the dual mass rubber damper pulley, and the application thereof is not limited thereto. It may also be applied to a variety of damper pulleys such as the viscous damper pulley and the viscous-isolation damper pulley.

As set forth above, according to exemplary forms of the present disclosure, rubber and the like may not be interposed between the pulley and the hub, and one end of the pulley and one end of the hub may be combined into one unit so that the pulley and the hub may rotate together, and thus a relative motion or displacement may not occur between the pulley and the hub. As the relative motion does not occur between the pulley and the hub, the torsional vibrations of the engine may be directly transmitted to the accessory belt through the pulley. As the torsional vibrations of the engine are directly transmitted to the accessory belt, the torsional vibrations of the engine may not be amplified, and thus the torsional vibrations and NVH transmitted to the accessory belt may be reduced, and durability may be significantly improved.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure.

What is claimed is:

1. A damper pulley for a crankshaft, the damper pulley comprising:
  a hub including a first cylindrical portion, a first closed end provided at a first end of the first cylindrical portion, and a first open end provided at a second end of the first cylindrical portion;
  a pulley including a second cylindrical portion having a plurality of grooves, a second closed end provided at a first end of the second cylindrical portion, and a second open end provided at a second end of the second cylindrical portion; and an offset portion protruding from the second closed end of the pulley toward an outside of the pulley to form a recess, wherein the first closed end of the hub is fit in the recess of the offset portion of the pulley, and the first closed end of the hub and the second closed end of the pulley are fixedly combined to each other and rotate together.

2. The damper pulley according to claim 1, wherein the first cylindrical portion of the hub is arranged to be concentric with the second cylindrical portion of the pulley.

3. The damper pulley according to claim 1, wherein a plurality of holes are provided in the first closed end of the hub and the second closed end of the pulley.

4. The damper pulley according to claim 1, wherein a first annular mass is mounted on an outer surface of the first cylindrical portion of the hub through a first rubber.

5. The damper pulley according to claim 4, wherein a second annular mass is mounted on an inner surface of the second cylindrical portion of the pulley through a second rubber.

6. The damper pulley according to claim 5, wherein the first annular mass and the second annular mass are arranged in a radial direction of the hub.

7. The damper pulley according to claim 6, wherein the first annular mass has a mass body extending along an axis of the hub, and a disc portion extended from an edge of the mass body in an outer diameter direction thereof.

8. The damper pulley according to claim 7, wherein the mass body of the first annular mass and an inner surface of the second annular mass are spaced apart from each other by a first gap in the radial direction of the hub, and the disc portion of the first annular mass and a lateral end portion of the second annular mass are spaced apart from each other by a second gap in a longitudinal direction of the hub.

\* \* \* \* \*